United States Patent [19]
Hashimoto et al.

[11] Patent Number: 5,168,854
[45] Date of Patent: Dec. 8, 1992

[54] METHOD AND APPARATUS FOR DETECTING FAILURE OF PRESSURE SENSOR IN INTERNAL COMBUSTION ENGINE

[75] Inventors: Atsuko Hashimoto; Toshio Iwata; Wataru Fukui; Toshio Ohsawa, all of Himeji, Japan

[73] Assignee: Mitsubishi Denki K.K., Tokyo, Japan

[21] Appl. No.: 748,721

[22] Filed: Aug. 22, 1991

[30] Foreign Application Priority Data

Aug. 24, 1990 [JP] Japan ................................ 2-221157
Aug. 24, 1990 [JP] Japan ................................ 2-221158

[51] Int. Cl.⁵ ............................................... F02P 5/14
[52] U.S. Cl. ..................................... 123/425; 123/690
[58] Field of Search ............... 123/425, 490, 479, 690; 364/437.08, 558; 73/4 R, 115, 117.3, 116

[56] References Cited

U.S. PATENT DOCUMENTS

| | | | |
|---|---|---|---|
| 4,320,729 | 3/1982 | Sawada et al. | 123/425 |
| 4,531,399 | 2/1985 | Aono | 73/4 R |
| 4,821,194 | 4/1989 | Kawamura | 364/431.08 |
| 4,903,664 | 2/1990 | Shinshi | 123/425 |
| 4,970,667 | 11/1990 | Abo | 364/558 |
| 4,995,365 | 2/1991 | Denz et al. | 123/479 |

Primary Examiner—Raymond A. Nelli
Attorney, Agent, or Firm—Sughrue, Mion, Zinn, Macpeak & Seas

[57] ABSTRACT

Method and apparatus for detecting a failure of a pressure sensor provided in association with a cylinder of an internal combustion engine for detecting the pressure therein. Decision as to occurrence of a failure in the pressure sensor is made on the basis of the cylinder pressure detected by the pressure sensor through comparison with a prescribed reference value or range. Failure of the pressure sensor is determined if the detected cylinder pressure deviates from the reference value or range by a predetermined amount. Upon detection of a pressure sensor failure, an engine control parameter such as ignition timing for controlling the associated cylinder in dependence on the pressure sensor output is set to a fixed value or the operation of the cylinder is stopped.

20 Claims, 11 Drawing Sheets

METHOD AND APPARATUS FOR DETECTING FAILURE OF PRESSURE SENSOR IN INTERNAL COMBUSTION ENGINE

BACKGROUND OF THE INVENTION

The present invention relates generally to an engine control system for controlling an internal combustion engine, which system includes means for detecting an occurrence of misfire in a cylinder of the engine on the basis of the pressure therein. More particularly, the invention is concerned with a method and an apparatus for detecting failure or malfunction of a pressure sensor which is installed in association with an engine cylinder for the purpose of detecting the pressure therein.

In general, internal combustion engines (hereinafter also referred to as an engine for short) typified by four-cylinder four-cycle engines such as gasoline engines for motor vehicles and the like comprise a plurality of cylinders (e.g., four cylinders) and operates in four cycles including suction (intake), compression, power and exhaust strokes, respectively. In recent years, a microcomputer-based engine controller is increasingly adopted in this kind of engine with the aim for realizing optimal control of ignition timings of igniters provided for engine cylinders, a fuel injection sequence and other factors participating in the engine operation.

For effectuating the optimal engine control, the microcomputer-based engine controller fetches therein not only the signals representing various operating conditions and running states of the engine but also a reference position signal for each cylinder in synchronism with the engine rotation and cylinder identification signals identifying the individual cylinders for the purpose of controlling on the per-cylinder basis the cylinder operation at the optimal timing by detecting operating positions (crank positions or angles) thereof. As the means for generating the reference position signal and the cylinder identification signal, there is conventionally employed an angular signal generator designed for generating a synchronous signal by detecting an angular position of a camshaft or a crankshaft of the engine.

Through the ignition control for each cylinder, a fuel/air mixture compressed by a piston must undergo explosive combustion, being fired by a spark produced by an spark plug at a proper timing (or time point). In this conjunction, it is known that the combustion sometimes fails to take place at the optimal timing, depending on the engine running states or other factors, which necessarily results in an insufficient output torque. Furthermore, nevertheless of the ignition control, it may sometimes occur that no combustion takes place within a cylinder, depending on the type of the fuel, state of the spark plugs and other factors, as a result of which abnormal load is imposed on the other cylinder(s), which may eventually lead to serious problems such as injury or damage of the engine as well as discharge of uncombusted gases to the atmosphere.

Such being the circumstances, in order to assure safe operation of the engine, it is required to detect on an ignition-cycle basis whether or not combustion actually occurs at the optimal timing in each cylinder. To this end, there has been proposed a system for detecting the cylinder pressure (i.e., pressure within the cylinder) during the explosion or power stroke following the ignition, to thereby discriminatively identify the occurrence of combustion or misfire (i.e. non-occurrence of the combustion). By way of example, it is known to perform feedback control of the ignition timing by making use of a deviation from a peak position corresponding to a peak of the cylinder pressure so that the peak position or the corresponding crank angle takes place at a crank angle of 15° after top dead center (TDC). Additionally, a misfire detecting system is also employed which is designed to determine the occurrence of misfire unless the cylinder pressure rises to a sufficiently high level during the power stroke, thereby indicating the occurrence of misfire in the associated cylinder in order to allow the corresponding engine control to be performed.

For a better understanding of the invention, a typical example of the misfire detecting systems will be described by reference to FIG. 13 which shows schematically the structure of an internal combustion engine equipped with an engine controller.

In this figure, a reference numeral 1 denotes generally a cylinder constituting a major part of the engine. The cylinder 1 includes a combustion chamber 2, a spark plug 3 mounted within the combustion chamber 2, a piston 4 adapted to be driven under explosive combustion of a fuel/air mixture within the combustion chamber 2, an intake port 5 for supplying the fuel/air mixture to the combustion chamber 2, an exhaust port 6 for discharging an exhaust gas resulting from the combustion, an intake valve 7 in the intake port 5 for controlling the fuel supply to the combustion chamber 2, and an exhaust valve 8 in the exhaust port 6 for controlling the discharge of exhaust gas from the combustion chamber 2.

The spark plug 3 is composed of a center electrode electrically connected to an ignition coil (described hereinafter) and a grounded electrode disposed in opposition to the center electrode. Needless to say, a four-cylinder engine, for example, includes four cylinders each of the structure described above.

Turning back to FIG. 13, a referenece numeral 9 denotes a fuel injector installed within the intake port 5 for supplying to the cylinder a fuel/air mixture of an air-fuel ratio which is determined by an amount of air flow controlled by a throttle valve (not shown) whose opening degree in turn is controlled by an accelerator pedal (also not shown). Further, an orifice 2a is formed in a wall portion of the cylinder defining the combustion chamber 2. A pressure sensor 10 detects the cylinder pressure (i.e. pressure within the cylinder) by way of the orifice 2a. An ignition coil 11 includes a primary winding and a secondary winding having an output terminal connected to the center electrode of the spark plug 3. A power supply source 12 applies a voltage of a minus (negative) polarity to an input terminal of the ignition coil 11. An ignition device 13 is connected to an output terminal of the primary winding of the ignition coil 11.

Finally, a microcomputer-based engine control unit 14 (also referred to as the engine controller or ECU for short) controls the operations of the engine as a whole including those of the intake valve 7, the exhaust valve 8, the fuel injector 9 and the ignition device 13. The engine controller unit or ECU 14 incorporates as constituent parts thereof a threshold generating circuit for generating a threshold level signal serving as a reference upon making a decision as to the occurrence of misfire as well as various arithmetic/processing units. The ECU 14 fetches therein a voltage signal respresentative of the cylinder pressure P outputted from the pressure sensor 10 together with a referenece position signal representative of reference cylinder positions and other various signals representing the engine running states.

For allowing the cylinder pressure signal P to be fetched by the ECU 14 at a predetermined time point(s) during the power stroke, there is provided an angular position sensor (not shown) for generating a reference position signal corresponding to a reference crank angle(s). The angular position sensor may include a rotatable slitted member having a slit formed at a position corresponding to the predetermined time point or timing in the explosion stroke, wherein the slit position corresponding to the predetermined timing may be set at a crank angle at which a remarkable difference in the cylinder pressure develops in dependence on occurrence or non-occurrence of explosive combustion. To this end, the crank angle may be set to an angle selected from a range of 10° to 90° after top dead center. In this connection, the crank angle before reaching the top dead center will symbolically be represented by affixing a prefix "A" to the angle value while the crank angle after passing the top dead center will be represented by affixing a prefix "B".

FIG. 14 is a view for graphically illustrating in what manner the cylinder pressure P changes as a function of the crank angle $\theta$. In this figure, a symbol TDC represents top dead center at which the crank angle $\theta$ assumes a value of zero, $\theta_{Pmax}$ represents a peak crank angle corresponding to a maximum value Pmax of the cylinder pressure P, and $\theta_R$ represents an optimum peak crank angle.

Now, referring to FIG. 14 along with a flow chart shown in FIG. 15, description will be made of the control operation performed by the ECU 14 for the internal combustion engine shown in FIG. 13.

During two reciprocations of the piston 4, there take place within the combustion chamber 2 four cycles of a suction stroke, a compression stroke, an explosion or power stroke and an exhaust stroke, respectively. In the course of the four-cycle operation, the ECU 14 optimally controls the amount of fuel supplied by the fuel injector 9 on each intake stroke, the ignition timing for the spark plug 3 and the like in accordance with the desired engine running state to be realized.

More specifically, when the fuel/air mixture is supplied to the combustion chamber 2 from the intake port 5 by opening the intake valve 7, the ECU 14 optimally controls the amount of fuel injected through the fuel injector 9 as well as the amount of air supplied through the intake port 5 in accordance with the opening degree of the throttle valve actuated by the accelerator pedal.

After the fuel/air mixture is compressed by the piston 4 within the combustion chamber 2, the ECU 14 drives the ignition device 13 at a predetermined timing to thereby electrically energize the primary winding of the ignition coil 11, as a result of which a high voltage of negative polarity is applied to the center electrode of the spark plug 3 from the secondary winding of that coil 11. Thus, electric discharge in the form of a spark takes places between the center electrode and the grounded electrode, firing the compressed fuel/air mixture in the combustion chamber 2 for explosive combustion. Usually, the ignition timing is so controlled as to occur at a crank angle close to top dead center (TDC), i.e. the crank angle of approximately zero.

Upon occurrence of the combustion or explosion, the cylinder pressure P within the combustion chamber 2 becomes high. Needless to say, the cylinder pressure P is constantly detected by the pressure sensor 10. However, if no explosion or misfiring takes place, the cylinder pressure remains at a relatively low level. Of course, the cylinder pressure P assumes the maximum value Pmax at the peak crank angle $\theta_{Pmax}$. However, in order to make the maximum output torque available, it is desirable that the peak crank angle $\theta_{Pmax}$ coincide with the optimal position $\theta_R$ (e.g., 15° after TDC).

On the basis of the cylinder pressure detected by the pressure sensor 10, the ignition timing feedback control is so performed as illustrated in FIG. 15. More specifically, in step S101, the cylinder pressure P is detected by the pressure sensor 10, whereon the peak crank angle $\theta_{Pmax}$, at which the cylinder pressure P assumes the maximum value Pmax, is determined by the ECU 14 on the basis of the sensor output waveform representative of a change in the cylinder pressure P (such as shown in FIG. 14).

Subsequently, in step S102, a difference or deviation $\Delta\theta_P$ of the peak crank angle $\theta_{Pmax}$ from the optimal position $\theta_R$ is determined as follows:

$$\Delta\theta_P = \theta_R - \theta_{Pmax}$$

Next, in step S102, the deviation $\theta_P$ is multiplied by a feedback gain correcting coefficient K ($\leqq 1$) to arithmetically determine an ignition timing correction quantity $\Delta\theta_{ig}$ in accordance with the following equation:

$$\Delta\theta_{ig} = K \times \Delta\theta_P$$

Finally, in step 103, the feedback control quantity for controlling the ignition timing is arithmetically determined by the ECU 14 on the basis of the correcting quantity $\Delta\theta_{ig}$ as follows:

$$\theta_{ig} = \theta_{MAP} + \Delta\theta_{ig}$$

where $\theta_{MAP}$ represents a value of the ignition timing previously established in dependence on the operating state of the engine or other factors while looking at a map or table.

At this juncture, it should be mentioned that the pressure sensor 10 is composed of a metal diaphragm or membrane disposed on the side exposed to the pressure within the cylinder and a piezoelectric circuit for outputting the sensed cylinder pressure P in the form of an electrical signal. Consequently, when a failure such as short-circuit, disconnection, wire breakage or the like fault (referred to as minor failure) occurs in the circuit of the pressure sensor 10, the cylinder pressure P as detected exhibits an abnormal value, which will ultimately results in that the feedback control illustrated in FIG. 15 is prevented from being properly and correctly carried out. On the other hand, if injury of the metal diaphragm or membrane (referred to as heavy failure to distinguish it from the minor failure mentioned above) should take place, not only the feedback control is rendered impossible but also such unwanted situation may be incurred that combustible gas within the combustion chamber 2 diffuses into the interior of the pressure sensor 10 through the pressure-responsive diaphragm to thereby aggravate the injury of the pressure sensor. Besides, there may arise an undesirable event such as leakage of the combustible gas to the ambient through the pressure sensor 10 injured.

In this conjunction, it will be noted from the foregoing that the conventional internal combustion engine control apparatus is incapable of detecting such failures of the pressure sensor 10 as mentioned above. In other words, it is impossible for the ECU to accurately detect the cylinder pressure in case a failure has occurred in the pressure sensor, thus involving erroneous control on the ignition timing due to incorrect detection of the cylinder pressure.

SUMMARY OF THE INVENTION

In view of the state of the art described above, it is a primary object of the present invention to overcome the problems mentioned above by providing a method of detecting the occurrence of a failure in a pressure sensor on the basis of the cylinder pressure detected by the pressure sensor, to thereby prevent or obviate erroneous feedback control on the engine operation and other inconveniences otherwise brought about by the sensor failure.

Another object of the invention is to provide an apparatus for carrying out the method mentioned above.

For achieving the above and other objects which will be apparent as description proceeds, there is provided according to a first aspect of the present invention a method of detecting a failure of a pressure sensor provided in association with a cylinder of an internal combustion engine for detecting the pressure in the cylinder. The method comprises the steps of detecting the pressure in the cylinder by means of the pressure sensor to provide a cylinder pressure, setting a maximum permissible value and a minimum permissible value for the cylinder pressure, comparing the detected cylinder pressure with the maximum permissible value, comparing the detected cylinder pressure with the minimum permissible value, and deciding that the pressure sensor suffers from a failure if the cylinder pressure exceeds the maximum permissible value or if the cylinder pressure is below the minimum permissible value.

According to a second aspect of the present invention, there is provided a method of detecting a failure of a pressure sensor in an internal combustion engine, the method comprising the steps of detecting the pressure in a cylinder of the engine by means of the pressure sensor at a first and a second predetermined crank angle, respectively, to provide a first and a second cylinder pressure, setting a maximum permissible value for the first cylinder pressure and a minimum permissible value for the second cylinder pressure, comparing the first detected cylinder pressure with the maximum permissible value, comparing the second detected cylinder pressure with the minimum permissible value, and deciding that a failure takes place in the pressure sensor if the first detected cylinder pressure exceeds the maximum permissible value or if the second detected cylinder pressure is below the minimum permissible value.

According to a third aspect of the invention, there is provided a method of detecting a failure of a pressure sensor in an internal combustion engine, the method comprising the steps of detecting the pressure in a cylinder of the engine by means of the pressure sensor at first and second predetermined crank angle, respectively, to provide a first and a second cylinder pressure, determining a difference between the first and second detected cylinder pressures, setting a threshold value as a reference for the difference, comparing the difference with the threshold value, and deciding that the pressure sensor suffers from a failure when the difference is less than the threshold value.

According to a fourth aspect of the invention, there is provided a method of detecting a failure of a pressure sensor in an internal combustion engine, the method comprising the steps of detecting the pressure in a cylinder of the engine by means of the pressure sensor on an power stroke of the cylinder to provide a cylinder pressure, detecting a peak crank angle corresponding to a peak value of the cylinder pressure, determining a peak position value on the basis of the peak crank angle, setting a maximum permissible value and a minimum permissible value for the peak position value, comparing the peak position value with the maximum permissible value, comparing the peak position value with the minimum permissible value, and deciding that the pressure sensor suffers from a failure if the peak position value exceeds the maximum permissible value or if the peak position information is below the minimum permissible value.

According to a fifth aspect of the invention, there is provided a method of controlling the operation of an internal combustion engine in response to occurrence of a failure in a pressure sensor provided in association with a cylinder of the engine. The method comprises the steps of making decision as to occurrence of a failure in the pressure sensor on the basis of the pressure in the cylinder detected by the pressure sensor, and fixing an engine control parameter if it is decided that a failure occurs in the pressure sensor.

According to a sixth aspect of the invention, there is provided a method of controlling the operation of an internal combustion engine in response to occurrence of a failure in a pressure sensor, the method comprising the steps of making decision as to occurrence of a failure in the pressure sensor on the basis of the pressure in a cylinder of the engine detected by the pressure sensor, fixing an engine control parameter if it is decided that a failure occurs in the pressure sensor, making decision as to whether or not the failure is a heavy failure, and stopping the control on the cylinder if the heavy failure is identified.

According to a seventh aspect of the invention, there is provided a method of controlling operation of an internal combustion engine in response to occurrence of a failure in a pressure sensor, the method comprising the steps of making decision as to occurrence of a failure in the pressure sensor on the basis of the pressure in a cylinder of the engine detected by the pressure sensor, and controlling an engine control parameter such that the cylinder pressure is suppressed below a predetermined level, if it is decided that the pressure sensor suffers from a failure.

According to a further aspect of the present invention, there is provided an engine control apparatus for carrying out the methods described above, the apparatus comprising means for making decision as to occurrence of a failure in a pressure sensor on the basis of the pressure in a cylinder of an engine detected by the pressure sensor, and means for controlling an engine control parameter such that the pressure in the cylinder is suppressed below a predetermined level if it is decided that the pressure sensor suffers from a failure.

Other objects, advantages, and novel features of the invention will become more apparent from the following detailed description thereof, when it is considered in conjunction with the accompanying drawings.

DESCRIPTION OF THE PREFERRED EMBODIMENTS

Now, the present invention will be described in detail in conjunction with preferred or exemplary embodiments thereof by reference to the accompanying drawings.

Figure 1:
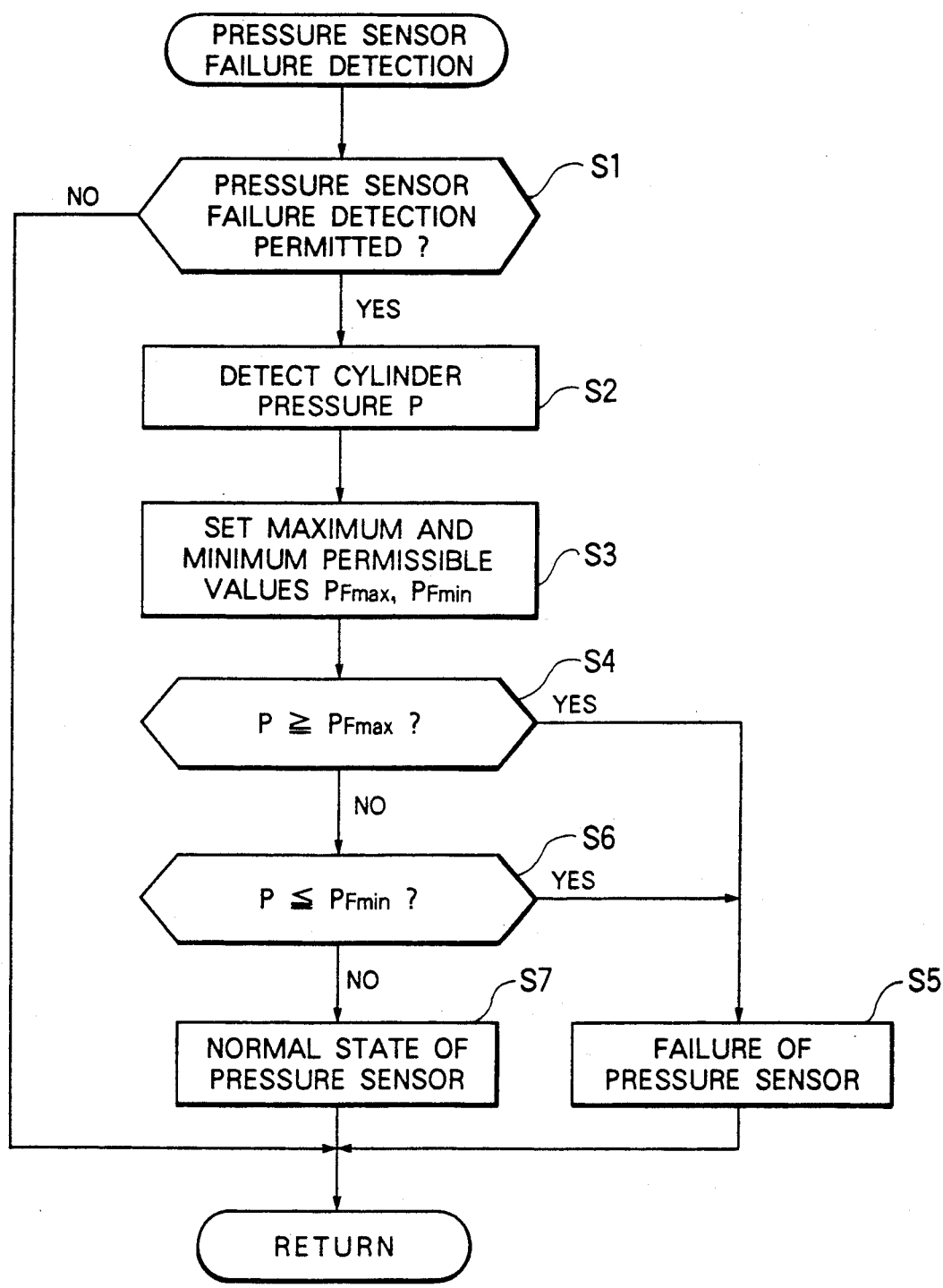
FIG. 1 is a flow chart for illustrating a procedure for detecting a sensor failure according to a first embodiment of the present invention.
Figure 2:
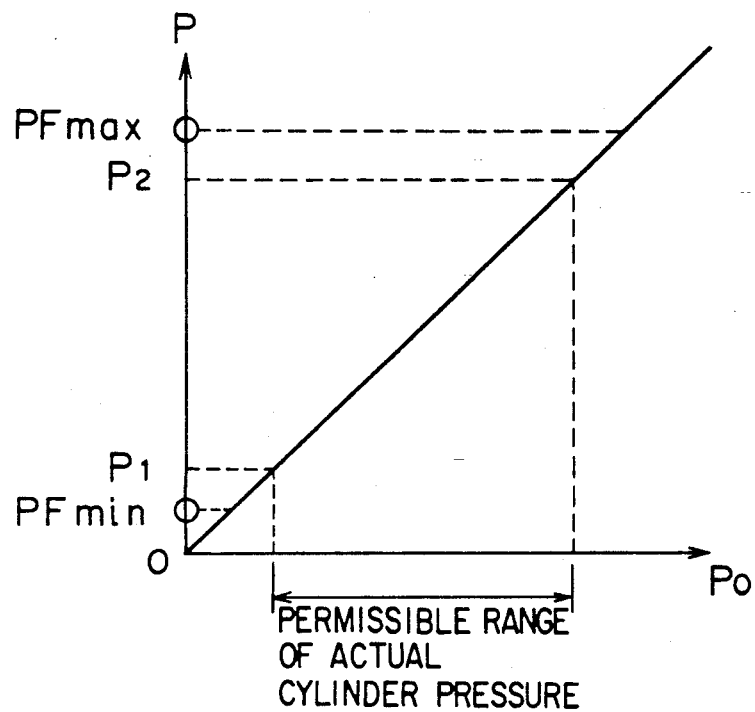
FIG. 2 is a characteristic diagram for graphically illustrating a relation existing between an actual cylinder pressure ($P_0$) and a detected cylinder pressure (P) together with a permissible cylinder pressure range.

FIG. 1 is a flow chart for illustrating a pressure sensor failure detecting method according to an embodiment of the invention. Further, FIG. 2 is a characteristic diagram for graphically illustrating a relation existing between an actual cylinder pressure $P_0$ and a detected cylinder pressure P (sensor output voltage signal representative of the cylinder pressure). In FIG. 2, a reference symbol $P_1$ represents a lower limit value of a permissible range of the cylinder pressure P with a symbol $P_2$ representing an upper limit value thereof. Additionally, a symbol $P_{Fmin}$ represents a minimum permissible value set for the lower limit $P_1$ while a symbol $P_{Fmax}$ represents a maximum permissible value set for the upper limit $P_2$. Parenthetically, an internal combustion engine to which the present invention is applied may be of the same structure as that shown in FIG. 13 except that a part of program to run on the engine controller ECU 14 is altered or modified so as to implement the teachings of the present invention.

Now, referring to FIGS. 1 and 2 along with FIG. 13, the pressure sensor failure detection procedure according to the first embodiment of the invention will be described in detail.

Referring to FIG. 1, decision is first made as to whether or not the internal combustion engine is in the state which allows the pressure sensor failure detecting procedure to be executed (step S1). If the result of the decision in step S1 is negative (NO), indicating that the engine is in a transient or unstable state inhibiting the execution of the failure detection processing, a return is made to the start. In case the engine is in the steady state suited for the execution of the sensor failure detection processing, the cylinder pressure P is fetched from the pressure sensor 10 in step S2. At that time, the cylinder pressure signal P from the pressure sensor 10 must be of a voltage value (or magnitude) which is in proportion to the actual cylinder pressure $P_0$, as shown in FIG. 2. In this conjunction, it is to be noted that the range of the values which the cylinder pressure $P_0$ can assume in the normal operating state of the cylinder is approximately from about 0.2 atm. to about 50 atm., while a cylinder pressure range approximately from about 0.2 atm. to about 2 atm. can be taken in case misfiring takes place.

Subsequently, in step S3, a maximum permissible value $P_{Fmax}$ and a minimum permissible value $P_{Fmin}$ are set for the upper limit value and the lower limit value, respectively, of the cylinder pressure P. In that case, the minimum permissible value $P_{Fmin}$ may be set at a pressure of 0.1 atm., while the maximum permissible value $P_{Fmax}$ may be set to a value in a range of about 70 to about 100 atm., by taking into account variations in the lower limit value $P_1$ and the upper limit value $P_2$ which delimit the permissible cylinder pressure range.

In practical applications, however, level of the cylinder pressure P varies in dependence on the running or operating state of the engine (such as the opening degree of the throttle valve). Accordingly, it is desirable to change the maximum permissible value $P_{Fmax}$ and the minimum permissible value $P_{Fmax}$ in dependence on the running or operating state of the engine.

Figure 3:
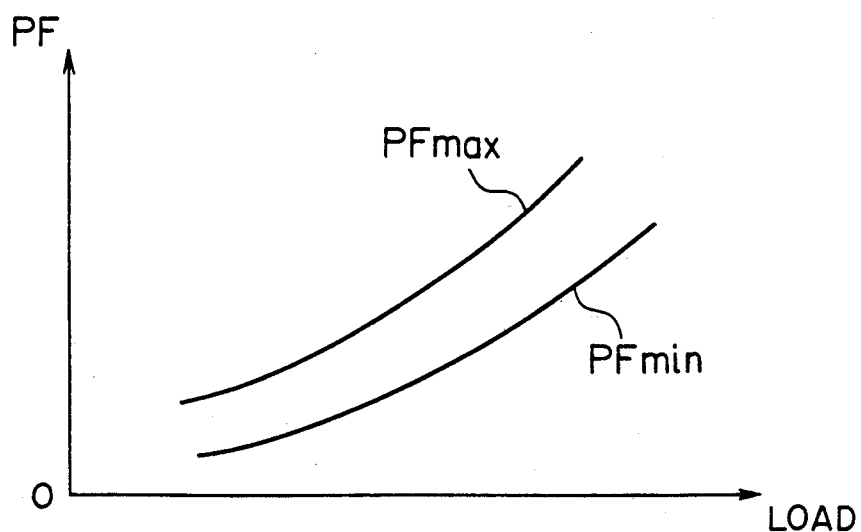
FIG. 3 is a view showing typical changes of a maximum permissible value $P_{Fmax}$ and a minimum permissible value $P_{Fmin}$, respectively, as a function of a change in load for illustrating how to establish a reference value for making decision as to the occurrence of failure in a pressure sensor.

To this end, engine operating state detecting means may be incorporated in the ECU 14 to thereby allow the maximum permissible value $P_{Fmax}$ and the minimum permissible value $P_{Fmin}$ to be correspondingly established in accordance with the engine load state (or the running state). FIG. 3 shows characteristic curves for illustrating typical changes in the maximum permissible value $P_{Fmax}$ and the minimum permissible value $P_{Fmin}$, respectively, as a function of a change in the engine load. It will be seen that the permissible values $P_{Fmax}$ and $P_{Fmin}$ change proportionately to the change in the engine load.

Now, in step S4 of FIG. 1, the cylinder pressure P as detected is compared with the maximum permissible value $P_{Fmax}$. If it is found that $P \geq P_{Fmax}$, decision is then made in step S5 that the pressure sensor 10 associated with a cylinder whose pressure is to be detected is in a failure state.

On the other hand, if execution of the comparison step S4 results in that $P < P_{Fmax}$, then the cylinder pressure P is compared with the minimum permissible value $P_{Fmin}$ in step S6. If it is found at this step that $P \leq P_{Fmin}$, decision is then made at step S5 that the pressure sensor 10 of that cylinder suffers from a failure.

On the other hand, when execution of the step S6 results in that $P > P_{Fmin}$, and hence that $P_{Fmin} < P < P_{Fmax}$, decision is then made in step S7 that the pressure sensor 10 of a cylinder for which the internal pressure is detected operates in the normal state.

By way of example, in case the output line and/or the grounded line of the pressure sensor 10 is broken (i.e. in the case of a wire breakage failure), the cylinder pressure signal P from the sensor 10 will exceed the maximum permissible value $P_{Fmax}$. Thus, a sensor failure due to the wire breakage can discriminatively be identified. Further, in the case of a short-circuit fault of the sensor output line, the cylinder pressure signal P from the sensor 10 will assume a value of zero, which is obviously smaller than the minimum permissible value $P_{Fmin}$. Thus, the short-circuit failure of the pressure sensor can be identified.

In this manner, if the cylinder pressure signal outputted from a pressure sensor 10 indicates an abnormal value, it is then decided that the pressure sensor 10 of concern suffers from a failure, while the normal or sound state of the pressure sensor 10 is ascertained if the sensor output pressure signal P falls within the permissible range.

In this way, for the cylinder equipped with the pressure sensor for which the failure has been determined through the procedure described above, there can precautiously be taken various measures for protecting the engine against falling in the unwanted states or situation described hereinbefore.

At this juncture, it should however be noted that the cylinder pressure P may assume remarkably different values or levels between the intake or suction stroke and the power stroke. For this reason, a simple comparison of the cylinder pressure P with the permissible pressure range can not always ensure highly reliable failure decision. In order to enhance the reliability of the sensor failure decision, it is conceivable to compare the cylinder pressure levels P at different crank positions with respective permissible values.

Now, description will be made of a second embodiment of the pressure sensor failure detection method according to the present invention in which failure detection of the pressure sensor 10 is effectuated on the basis of plural cylinder pressures P sensed at a plurality of different crank angles.

Figure 4:
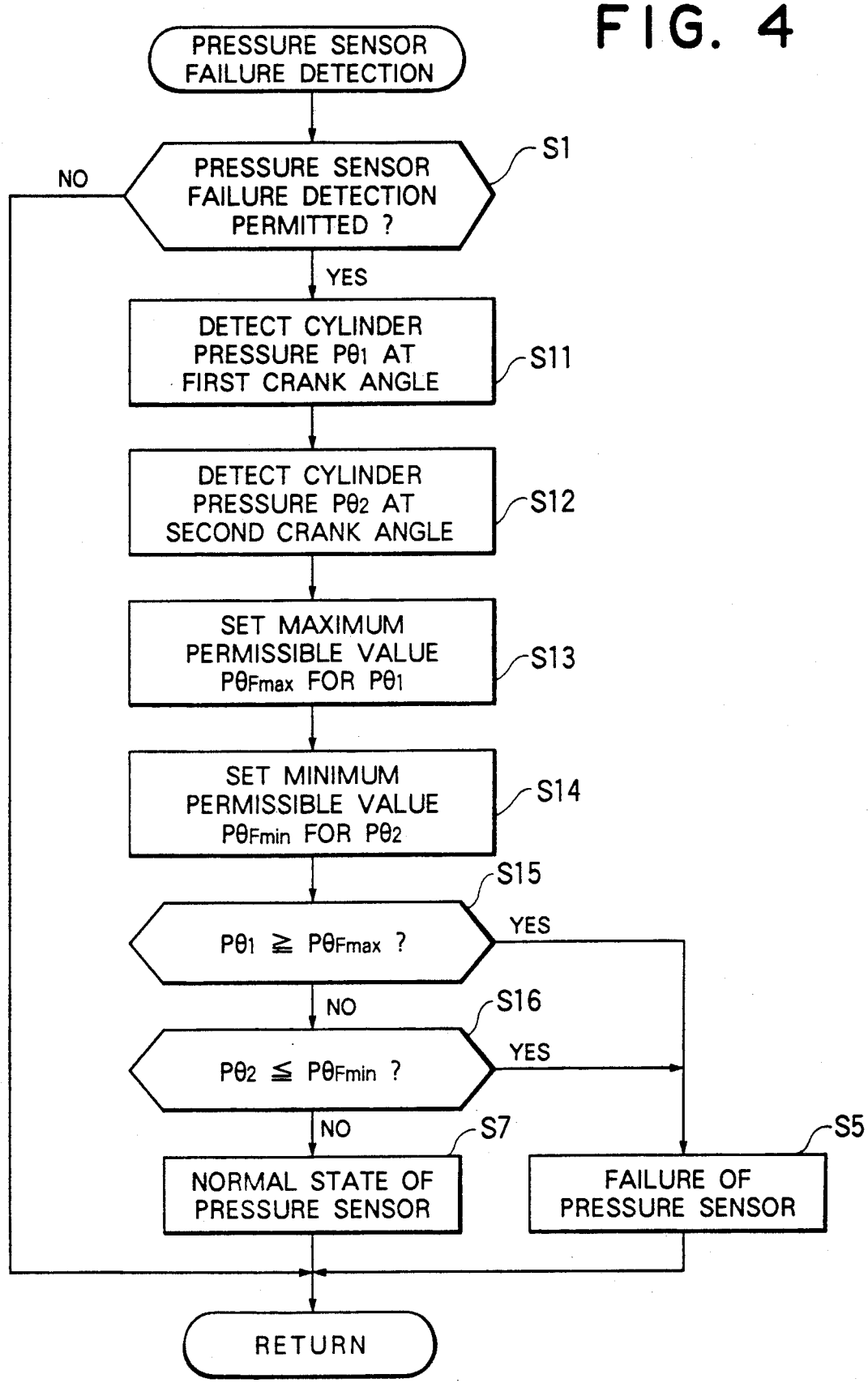
FIG. 4 is a flow chart for illustrating a pressure sensor failure detecting procedure according to a second embodiment of the invention.

FIG. 4 is a flow chart illustrating the pressure sensor failure detecting procedure according to the second embodiment of the invention. In this figure, steps S1, S5 and S7 are the same as those designated by like reference symbols in FIG. 1.

Figure 5:
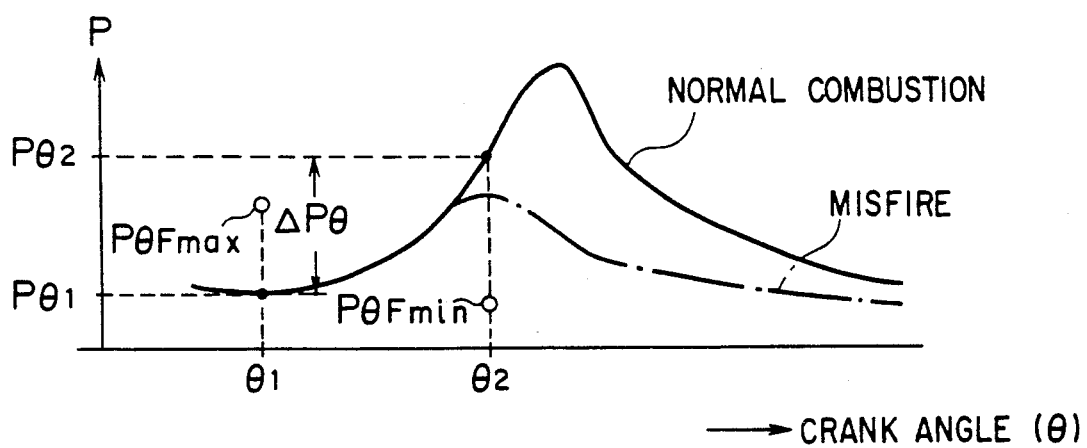
FIG. 5 is a view for graphically illustrating in what manner the cylinder pressure (P) changes as a function of the crank angle ($\theta$)

In this connection, FIG. 5 graphically illustrates in what manner the cylinder pressure P changes as a function of the crank angle $\theta$. In this figure, a solid line curve represents a change in the cylinder pressure when normal combustion occurs, while a single-dot broken line curve represents a change in the cylinder pressure upon occurence of misfiring. As can be seen from FIG. 5, the cylinder pressure P generally exhibits a high level in the case of normal combustion. In contrast, the cylinder pressure level P becomes significantly low when misfiring takes place, as indicated by the single-dot broken line curve. More specifically, when combustion occurs normally, the cylinder pressure P increases steeply after the piston has passed top dead center (TDC). In contrast, in case misfiring occurs, the piston 4 simply performs a coasting reciprocation. Consequently, change in the cylinder pressure results in a waveform which is remarkably gentle and symmetrical relative to the position of top dead center (TDC), as can be seen from the single-dot broken line curve.

In FIG. 5, the crank angle $\theta$ is taken along the abscissa with the cylinder pressure P being taken along the ordinate. Further, symbols $\theta_1$ and $\theta_2$ represent a first and a second crank angle, respectively, symbols $P\theta_1$ and $P\theta_2$ represent a first and a second cylinder pressure at the first and second crank angles $\theta_1$ and $\theta_2$, respectively, a symbol $P\theta_{Fmax}$ represents a maximum permissible level for the first cylinder pressure $P\theta_1$, and a symbol $P\theta_{Fmin}$ represents a minimum permissible level or value for the second cylinder pressure $P\theta_2$. Additionally, $P\theta$ represents a difference between the first and the second cylinder pressures $P\theta_1$ and $P\theta_2$, which difference is made use of according to the teaching of the invention incarnated in a third embodiment thereof, as will be described later.

Incidentally, the rotation type crank angle sensor (not shown) employed in connection with the second embodiment of the invention is provided with a slit for generating a reference position signal in the form of a square pulse having a leading and a trailing edge which correspond to the first and the second crank angles $\theta_1$ and $\theta_2$, respectively.

In this embodiment, it is assumed that the first crank angle $\theta_1$ is set at bottom dead center (BDC) at which the cylinder pressure P assumes a lowest level in the intake stroke, while the second crank angle $\theta_2$ is set at top dead center (TDC) at which the cylinder pressure P becomes highest in the compression stroke. It should however be appreciated that these crank angles $\theta_1$ and $\theta_2$ can be set at any other appropriate positions.

Since the first cylinder pressure $P\theta_1$ is in the range of from about 0.2 atm. to about 1 atm., the maximum permissible value $P\theta_{Fmax}$, which is required to be set higher than the intake air pressure in a maximum load state of the engine, will be on the order of about 2 atm. On the other hand, since the second cylinder pressure $P\theta_2$ is in the range of from about 2 atm. to about 3 atm., the minimum permissible value $P\theta_{Fmin}$, which is required to be set lower than the intake air pressure in a minimum load state of the engine, will be on the order of about 1 atm.

Now, the second embodiment of the invention will be described by reference to FIG. 4 along with FIGS. 5 and 13.

In the engine operating state in which the pressure sensor failure decision procedure can be performed, the cylinder pressure $P\theta_1$ is first detected at the first crank angle $\theta_1$ in step S11, which is then followed by step S12 where the cylinder pressure $P\theta_2$ is detected at the second crank angle $\theta_2$.

Subsequently, the maximum permissible value $P\theta_{Fmax}$ is set for the first cylinder pressure $P\theta_1$ in step S13. Similarly, the minimum permissible value $P\theta_{Fmin}$ is set for the second cylinder pressure $P\theta_2$ in step S14.

Next, in step S15, the first cylinder pressure $P\theta_1$ at the first crank angle $\theta_1$ is compared with the maximum permissible value $P\theta_{Fmax}$. If the comparison shows that $P\theta_1 \geq P\theta_{Fmax}$, decision is made in step S5 that the associated pressure sensor 10 is in a failure state.

In contrast, if the above comparison step S15 results in that $P\theta_1 < P\theta_{Fmax}$, the second cylinder pressure $P\theta_2$ is then compared with the minimum permissible value $P\theta_{Fmin}$ in step S16. If this comparison shows that $P\theta_2 > P\theta_{Fmin}$, decision is made at step S5 that a failure occurs in the associated pressure sensor 10.

On the other hand, if it is found at the comparison step S16 that $P\theta_2 > P\theta_{Fmin}$, decision is then made in step S7 that the pressure sensor 10 of concern operates normally.

By comparing a plurality of cylinder pressures such as $P\theta_1$ and $P\theta_2$ at different crank angles such as $\theta_1$ and $\theta_2$ with relevant permissible values $P\theta_{Fmax}$ and $P\theta_{Fmin}$, respectively, as described above, decision as to the failure of the pressure sensor 10 can be made by taking into account the change in the cylinder pressure P as a function of the crank position, whereby reliability of the pressure sensor failure decision can significantly be improved. Besides, in view of the fact that during the compression stroke from bottom dead center to top dead center, the cylinder pressure P is scarcely subjected to variance in a relative sense, the detection can be performed with enhanced stability.

Figure 6:
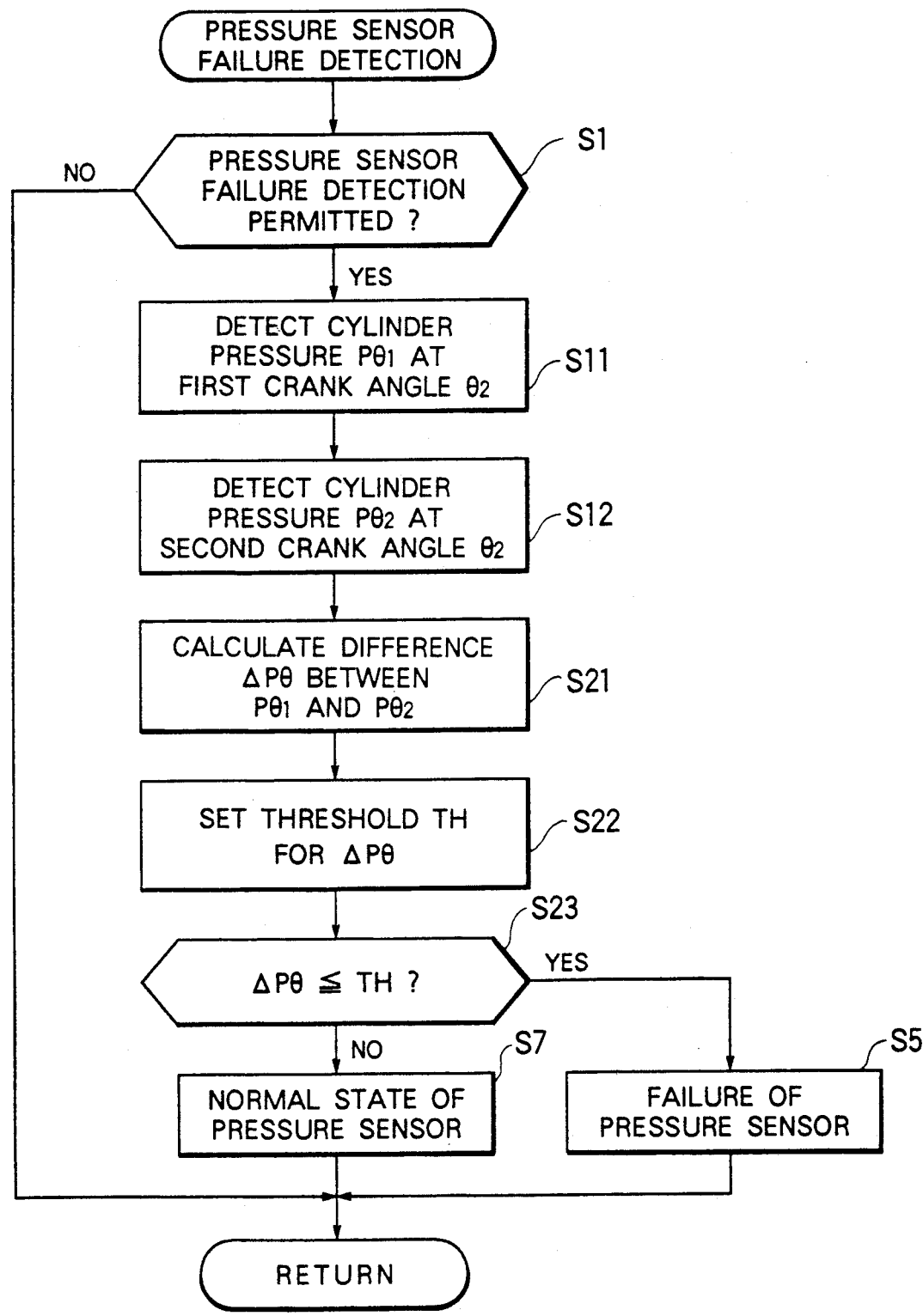
FIG. 6 is a flow chart illustrating a procedure for detecting occurrence of failure in a pressure sensor according to a third embodiment of the invention.
Figure 13:
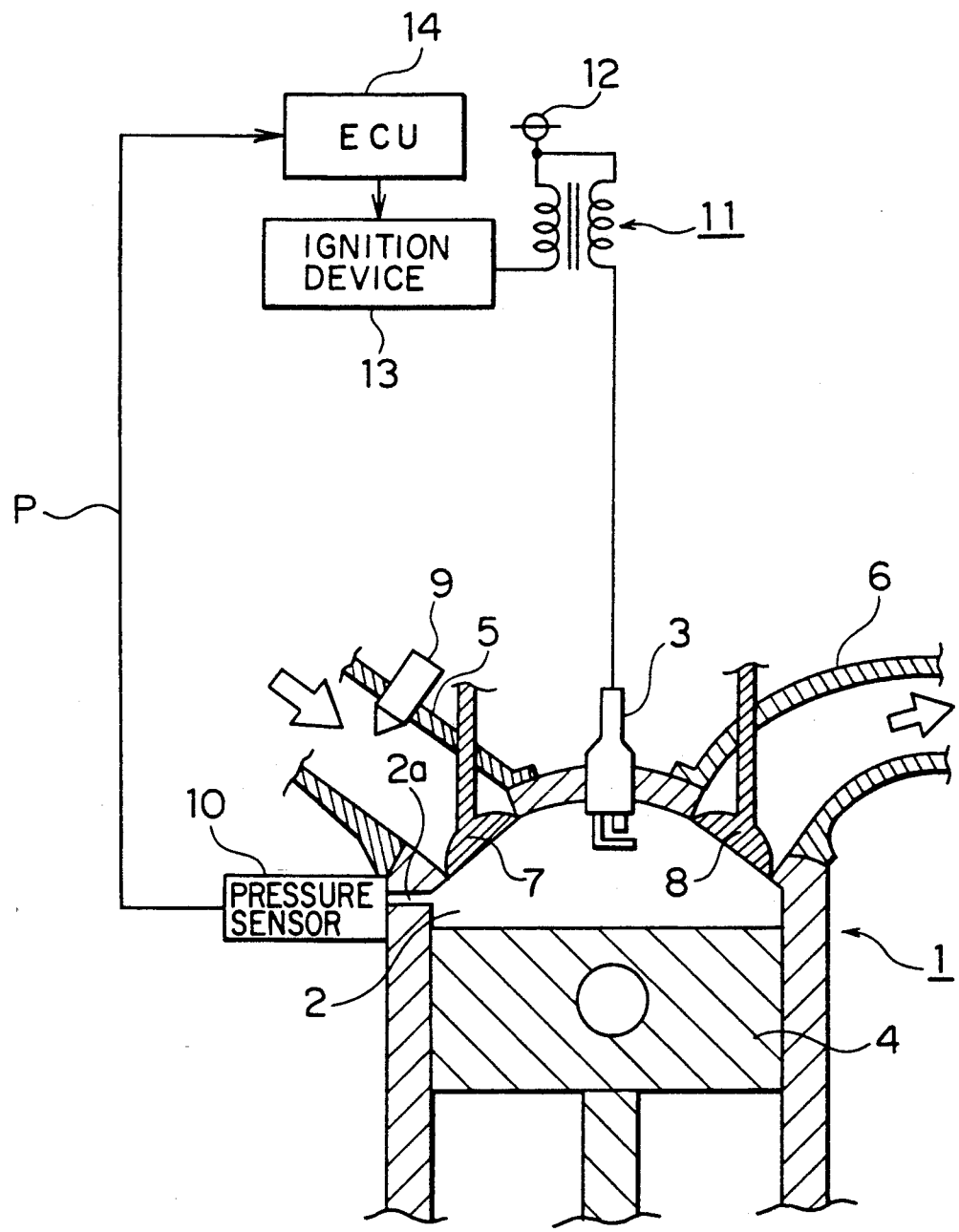
FIG. 13 is a schematic diagram showing the structure of a conventional internal combustion engine equipped with a microcomputer-based engine control system.
Figure 14:
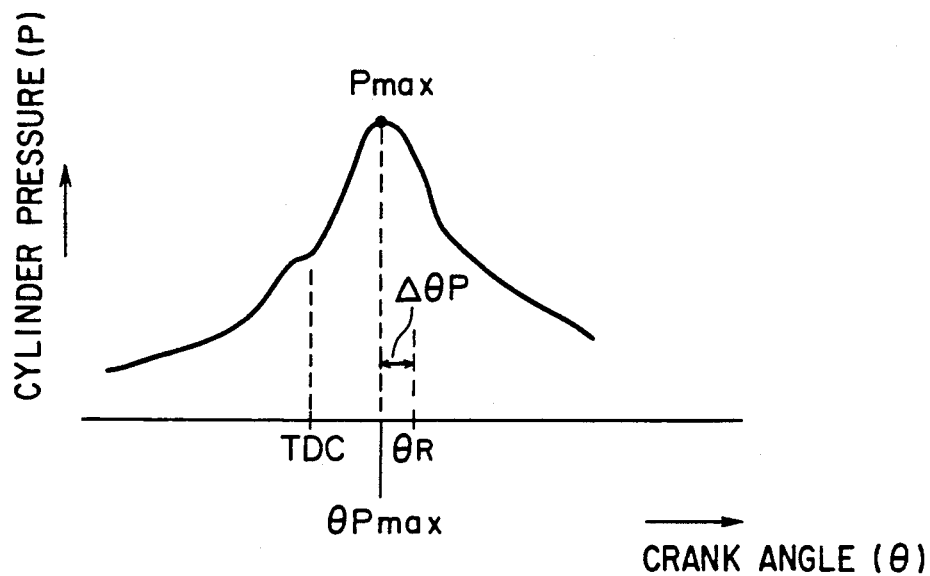
FIG. 14 is a view for graphically illustrating in what manner a cylinder pressure changes as a function of the crank angle.

Next, referring to FIG. 6 along with FIGS. 5 and 13, description will be directed to a third embodiment of the invention in which the failure decision of the pressure sensor is made on the basis of the difference $\Delta P\theta$ (FIG. 5) between the first and the second cylinder pressures $P\theta_1$ and $P\theta_2$.

FIG. 6 is a flow chart illustrating a procedure for carrying out the pressure sensor failure detection according to the third embodiment of the invention. In this figure, S1, S11, S12, S5 and S7 represent steps which are identical with those described above by using the same step designation symbols.

In the engine operating state in which the pressure sensor failure decision procedure is allowed to be executed, the first and the second cylinder pressures $P\theta_1$ and $P\theta_2$ are fetched from the output of the pressure sensor 10 (steps S11 and S12) at first and second predetermined crank angles $\theta_1$ and $\theta_2$, respectively, whereon the difference $\Delta P\theta$ between the first and the second cylinder pressure $P\theta_1$ and $P\theta_2$ is arithmetically determined in step S21.

Subsequently, a threshold value TH is set for the difference $\Delta P\theta$ in step S22, whereon the pressure difference $\Delta P\theta$ is compared with the threshold value TH in step S23. If it is found that $\Delta P\theta \leq TH$, decision is made that the associated pressure sensor 10 suffers from a failure (step S5). On the other hand, in case $\Delta P\theta > TH$, it is decided that the associated pressure sensor 10 is normal (step S7).

By making the failure decision on the basis of the pressure difference $\Delta P\theta$ in this manner, offset and drift components contained in the output of the pressure sensor 10 can be canceled out, whereby reliability in the pressure sensor failure decision is further enhanced.

Furthermore, by varying the threshold value TH in dependence on the engine running state by consulting a map prepared in advance to this end, there can be realized the failure detection of the pressure sensor 10 with higher reliability. In that case, the pressure difference $\Delta P\theta$ becomes greater, as the engine load increases. Accordingly, the threshold will have to be set at a correspondingly increased value.

Figure 7:
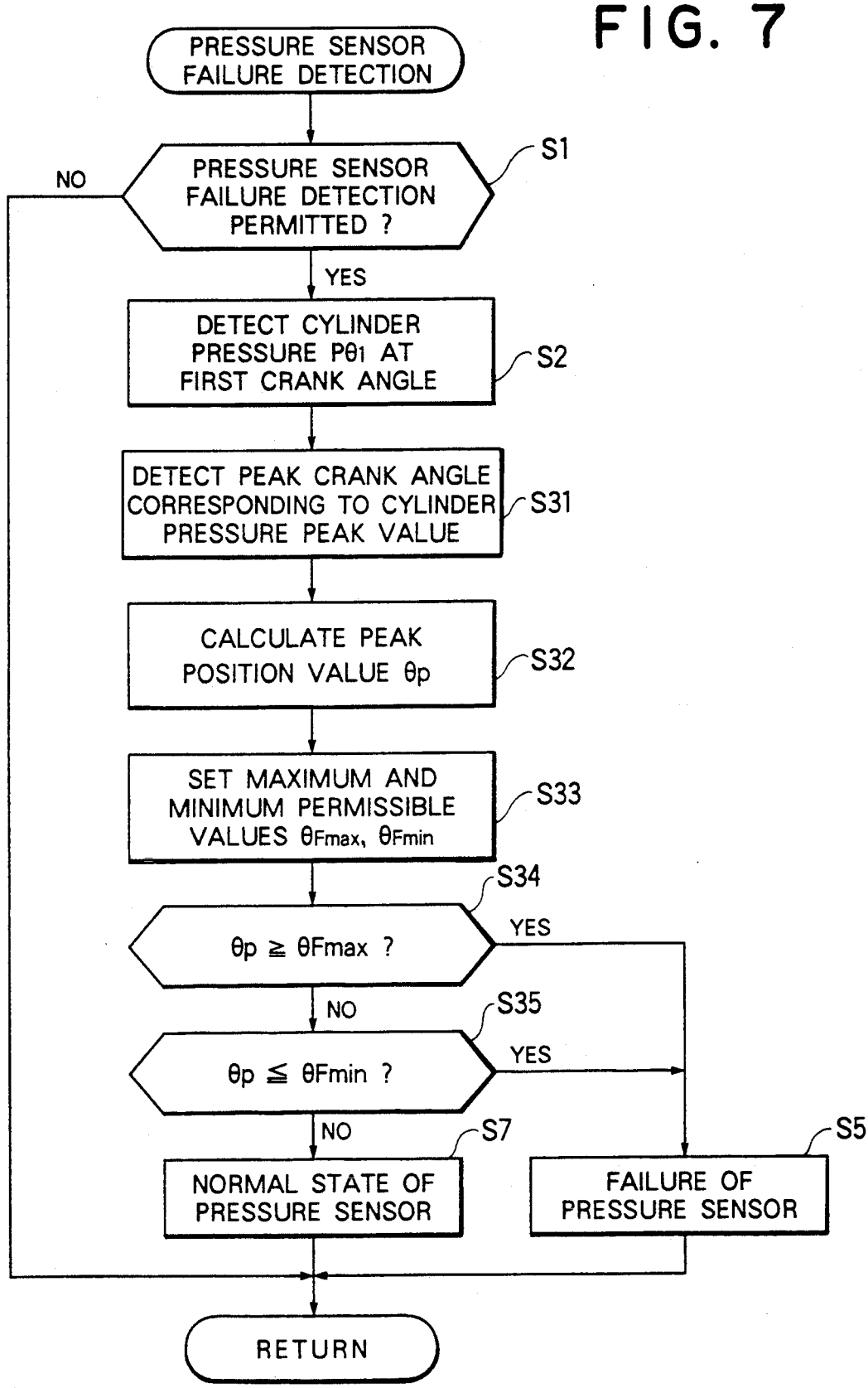
FIG. 7 is a flow chart illustrating a pressure sensor failure detecting procedure according to a fourth embodiment of the invention.
Figure 8:
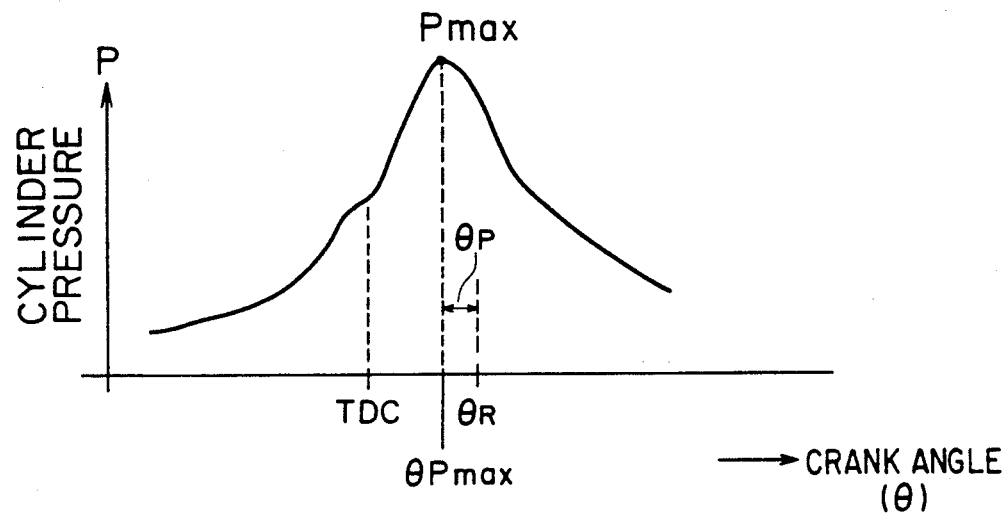
FIG. 8 is a view for graphically illustrating change in the cylinder pressure (P) during a combustion stroke.
Figure 9:
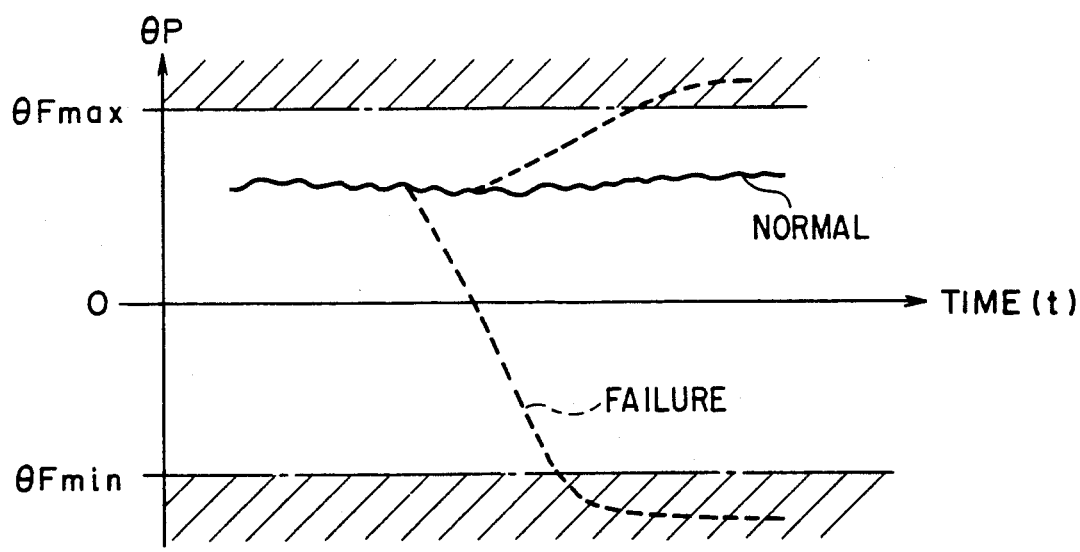
FIG. 9 is a view for illustrating in what manner decision as to a pressure sensor failure can be made according to a fourth embodiment of the invention.

Next, referring to FIGS. 7 to 9, description will be directed to a fourth embodiment of the invention according to which the pressure sensor failure detection is performed on the basis of peak position information (value) of the cylinder pressure. In this case, it is assumed, by way of example only, that the pressure sensor failure detection may be carried out on the basis of the peak position information used as a correcting quantity in an ignition timing feedback control performed on a cylinder-by-cylinder basis.

FIG. 7 is a flow chart illustrating a procedure for executing the pressure sensor failure detection according to the fourth embodiment of the invention. In this figure, steps S1, S2, S5 and S7 are the same as those described previously.

FIG. 8 shows a curve for illustrating a change in the cylinder pressure P during the combustion stroke. In this figure, a symbol $\theta_{Pmax}$ represents a peak crank angle corresponding to the crank position at which the cylinder pressure P has attained a peak value Pmax, and a symbol $\theta_R$ represents an optimal peak crank angle or angular position.

Further, FIG. 9 is a view for illustrating in what manner the failure decision according to the fourth embodiment of the invention is carried out. In this figure, time t is taken along the abscissa, and the peak position information used as the correcting quantity $\theta_P$ is taken along the ordinate, wherein symbols $\theta_{Fmax}$ and $\theta_{Fmin}$ represent a maximum permissible value and a minimum permissible value, respectively, for the correcting quantity $\theta_P$. Further, a solid line curve represents the correcting quantity $\theta_P$ in the normal state, while a broken line curve represents the same in the failure state of the pressure sensor. Parenthetically, hatched areas represent regions indicating the failure of the pressure sensor.

In the engine operating state in which the pressure sensor failure detection processing can be executed by the ECU, the cylinder pressure P is detected at least once in the course of the power stroke in step S2, which is followed by step S31 where the peak crank angle $\theta_{Pmax}$ corresponding to the peak value Pmax of the cylinder pressure is detected.

Subsequently, the peak position information (ignition timing correction quantity) $\theta_P$ is arithmetically determined on the basis of the peak crank angle $\theta_{Pmax}$ in step S32, whereon maximum and minimum permissible values $\theta_{Fmax}$ and $\theta_{Fmin}$ are set for the peak position information or correcting quantity $\theta_P$ in step S33.

In this case, since the peak position information $\theta_P$ represents a correcting value involved in the feedback control for controlling the ignition timing $\theta_{ig}$ such that the following equation $$\theta_{Pmax} = \theta_R (=15° \text{ after TDC})$$

is realized, the peak position information $\theta_P$ can be given by the following equation:

$$\theta_P = K(\theta_R - \theta_{Pmax})$$

where K represents a feedback gain correcting coefficient which can be set at a given value so long as the following condition is satisfied:

$$K \leq 1$$

By taking into account the correcting quantity $\theta_P$, the ignition timing $\theta_{ig}$ resulting from the feedback control is given by the following equation:

$$\theta_{ig} = \theta_{MAP} + \theta_P$$

where $\theta_{MAP}$ represents a value of the ignition timing previously determined in consideration of the engine operating state and other relevant factors while looking at a map or table.

Similarly, the maximum permissible value $\theta_{Fmax}$ and the minimum permissible value $\theta_{Fmin}$ for the peak position information (ignition timing correcting quantity) $\theta_P$ are set at values which depend on the engine operating state, as is illustrated in FIG. 3.

Next, the peak position information $\theta_P$ is compared with the maximum permissible value $\theta_{Fmax}$ in step S34. If the peak position information (ignition timing correcting quantity) $\theta_P$ is greater than the maximum permissible value $\theta_{Fmax}$ therefor, it is then decided that the relevant pressure sensor 10 suffers from failure (step S5).

On the contrary, in case the peak position information $\theta_P$ is smaller than the maximum permissible value $\theta_{Fmax}$, the former is compared with the minimum permissible value $\theta_{Pmin}$ (step S35). In case the peak position information $\theta_P$ is smaller than the minimum permissible value $\theta_{Fmin}$, decision is made that the pressure sensor 10 of concern is in the failure state (step S5), while the pressure sensor 10 is decided to be normal if the peak position information $\theta_P$ is greater than the minimum permissible value $\theta_{Fmin}$ (step S7).

In this manner, when the peak position information (ignition timing correcting quantity) $\theta_P$ determined based on the peak crank angle $\theta_{Pmax}$ departs from a predetermined permissible range delimited by the maximum permissible value $\theta_{Fmax}$ and the minimum permissible value $\theta_{Fmin}$, it is then decided that the pressure sensor 10 of concern is in the failure state.

In the case of the fourth embodiment of the invention described above, the ignition timing correcting quantity is used as the peak position information $\theta_P$. It should however be understood that the peak crank angle $\theta_{Pmax}$ may be used intact as the peak position information $\theta_P$ for direct comparison with a permissible range previously established in making decision for the pressure sensor failure.

Further, in each of the embodiments of the invention described hereinbefore, the pressure sensor failure detecting routine may be carried out on the cylinder basis for individually detecting an occurrence of a failure in the pressure sensor 10 for each of the cylinders.

According to the present invention, it is also taught that possible inconveniences and erroneous feedback control due to a pressure sensor failure can be prevented by appropriately controlling engine control parameters in accordance with the result of decision made as to the occurrence of failure in the cylinder pressure sensor.

Figure 10:
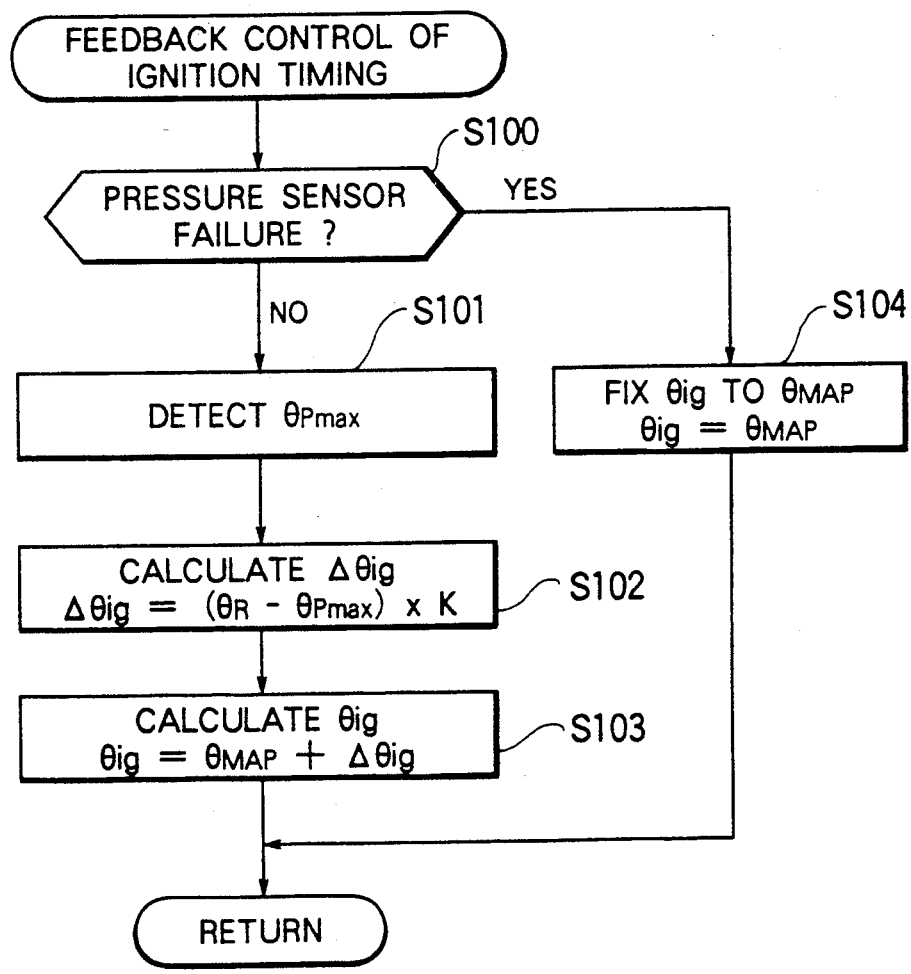
FIG. 10 is a flow chart illustrating a procedure for controlling ignition timing according to a fifth embodiment of the invention.

FIG. 10 shows another embodiment of the invention which is directed to the prevention of erroneous ignition timing control.

Figure 15:
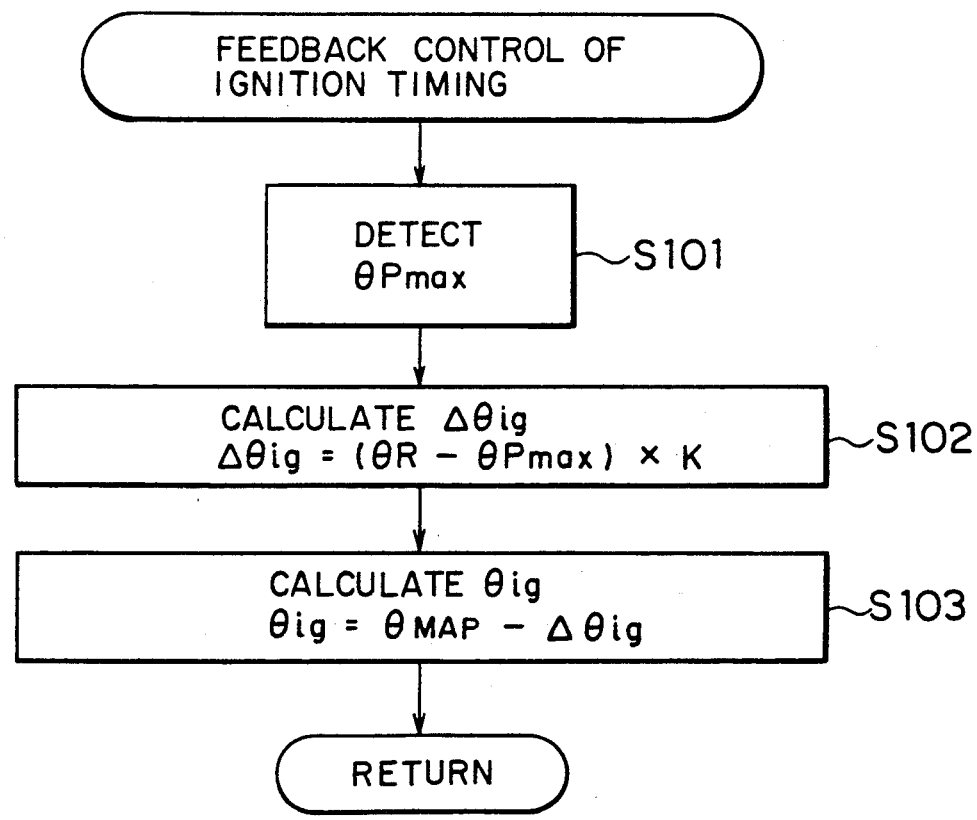
FIG. 15 is a flow chart showing a conventional ignition timing feedback control procedure.

Referring to the figure, decision is made in step S100 as to whether or not the pressure sensor 10 suffers from a failure by resorting to any one of the failure detection procedures described above. So long as the pressure sensor is normal, steps S101 to S103 similar to the feedback control routine described hereinbefore by reference to FIG. 15 are executed. On the other hand, when decision is made that the pressure sensor suffers from a failure, the feedback control is not performed but instead the ignition timing $\theta_{ig}$ is fixed to a map value $\theta_{MAP}$ (step S104). Thus, the possibility of erroneous ignition timing control can be excluded.

It should however be noted that the capability of preventing the erroneous feedback control of the engine parameter (e.g., ignition timing) as described above does not mean that occurrence of an undesirable situation due to the heavy failure of the pressure sensor 10 described hereinbefore can be evaded.

Figure 11:
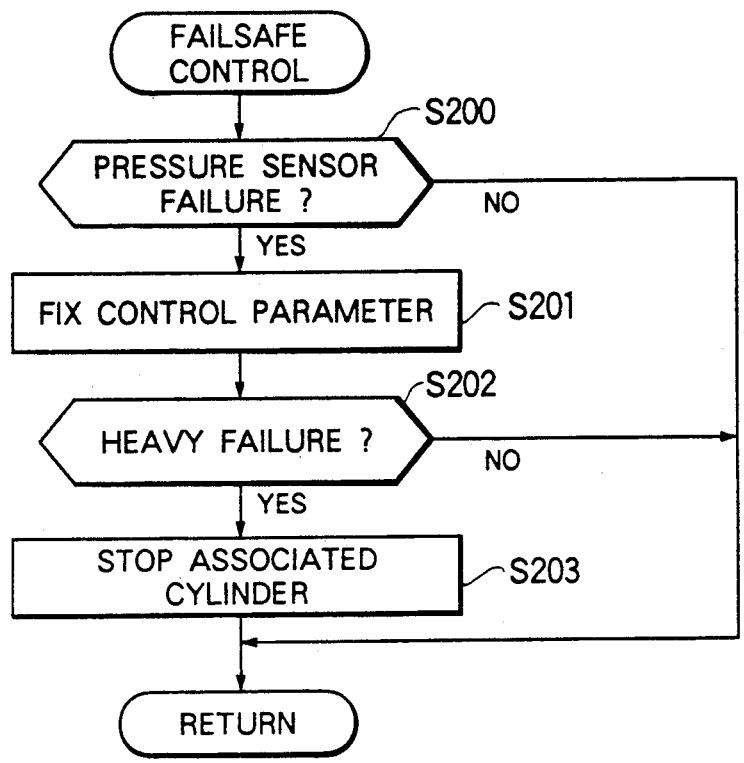
FIG. 11 is a flow chart for illustrating an engine control procedure according to a sixth embodiment of the invention.

Now, an ignition timing control method, which is carried out upon detection of the heavy failure of the pressure sensor 10 according to a further embodiment of the invention, will be described by reference to a flow chart shown in FIG. 11.

In this figure, steps S200 and S201 are similar to the steps S100 and S101 shown in FIG. 10. Parenthetically, steps to be executed when the normal state of the pressure sensor is decided are omitted from the illustration of FIG. 11.

As described previously, if it is decided in step S200 that the pressure sensor 10 suffers from a failure, a control parameter (e.g., ignition timing $\theta_{ig}$) is fixed to a map value $\theta_{MAP}$. Subsequently, decision is made in step S202 as to whether the failure is a heavy one.

In this regard the phrase "heavy failure" is intended to mean a physical or mechanical failure of the pressure sensor such as injury or damage of a metal membrane or diaphragm constituting a part of the pressure sensor 10 which might result in leakage of combustible gas or the like unwanted situation. This type of heavy failure can be detected on the basis of a decrease in explosion energy due to abnormal combustion, a significant variation in the output torque detected by an angular speed sensor, a temperature rise detected by a temperature sensor provided in combination with the pressure sensor 10 or the like.

In case decision is made in step S202 that the pressure sensor 10 suffers from a heavy failure, control for the cylinder to which that sensor 10 belongs is stopped to place the cylinder in the inoperative state (step S203).

To this end, the fuel injection to the cylinder may be suspended or the ignition control for that cylinder may be stopped or alternatively the operations of all the cylinders (i.e., the entire engine operation) may be stopped.

Hence, in place of fixing the control parameter (ignition timing) for the cylinder having the pressure sensor 10 detected as suffering from the failure to the map value $\theta_{MAP}$ at the step S201, as described hereinbefore, the associated cylinder or engine may also be protected against injury or damage by inhibiting a high-load operation.

Figure 12:
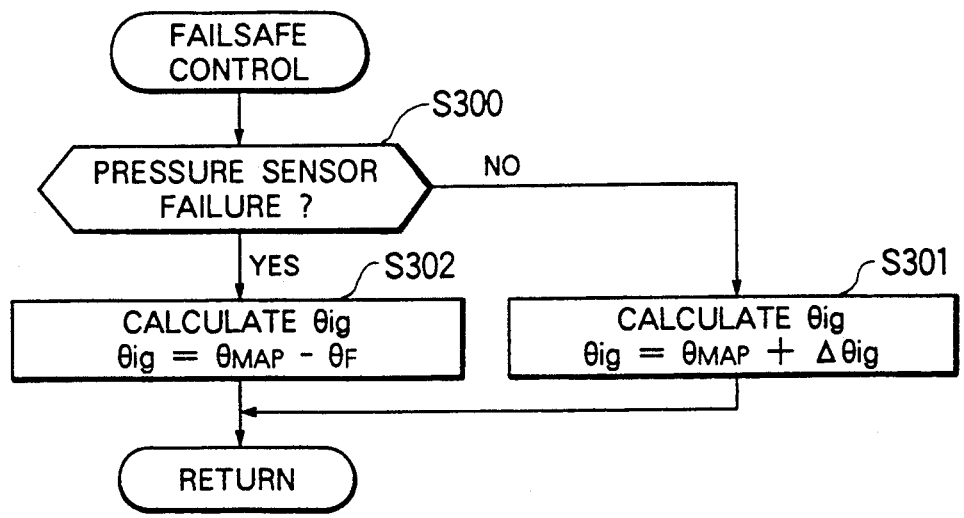
FIG. 12 is a flow chart for illustrating an engine control procedure according to a seventh embodiment of the invention.

FIG. 12 shows a further embodiment of the invention according to which the maximum value Pmax of the cylinder pressure P is suppressed upon detection of a failure of the associated pressure sensor 10.

Referring to the figure, if it is decided in step S300 that the pressure sensor 10 is normal, the ignition timing $\theta_{ig}$ is controlled through feedback control by using the correcting quantity $\Delta\theta_{ig}$, as described hereinbefore (step S301).

On the other hand, if a failure of the pressure sensor 10 is decided, the ignition timing $\theta_{ig}$ is retarded by a predetermined amount $\theta_F$ from the map value $\theta_{MAP}$ to be thereby fixed to a value given by $\theta_{ig}=\theta_{MAP}-\theta_F$ in step S302.

In general, the maximum value Pmax of the cylinder pressure P increases when the ignition timing $\theta_{ig}$ is controlled to advance, while the former decreases when the latter is controlled to retard. Thus, by the control for retarding the ignition timing $\theta_{ig}$ in step S302, the cylinder pressure P can be suppressed to a lower level.

Of course, the method of suppressing the cylinder pressure P is not restricted to the ignition timing retarding control, but any other method capable of inhibiting the high-load engine operation such as a supercharging operation can be adopted. To this end, there may be mentioned, by way of example, leaning of the air/fuel mixture, lowering of air supply pressure, limitation of the throttle valve to a predetermined opening degree, limitation of the engine rpm to less than a predetermined value or the like, while providing similar effects.

In the foregoing description of the embodiments of the invention, it has been assumed that the engine control parameter is the ignition timing $\theta_{ig}$. It should however be understood that the invention can equally be carried out by using other control parameters such as a fuel injection amount and the like with similar effects.

Further, since the sensor failure detecting routine is executed on the cylinder basis, the failure can be detected individually for the pressure sensor 10 provided in association with each of the cylinders. Thus, it is possible to stop engine operation upon detection of a failure or fault of any pressure sensor or alternatively to stop ignition control, fuel injection control, etc., or to suppress the cylinder pressure only for the cylinder for which a pressure sensor failure is detected.

What is claimed is:

1. A method of detecting a failure of a pressure sensor provided in association with a cylinder of an internal combustion engine for detecting the pressure therein, said method comprising the steps of:
   detecting the pressure in said cylinder by means of said pressure sensor to provide a cylinder pressure;
   setting a maximum permissible value and a minimum permissible value for said cylinder pressure;
   comparing said cylinder pressure with said maximum permissible value;
   comparing said cylinder pressure with said minimum permissible value; and
   determining that said pressure sensor suffers from a failure if said cylinder pressure exceeds said maximum permissible value or if said cylinder pressure becomes lower than said minimum permissible value.

2. A pressure sensor failure detecting method according to claim 1, wherein said maximum permissible value and said minimum permissible value are set in dependence on the load state of said engine.

3. A pressure sensor failure detecting method according to claim 1, wherein said cylinder pressure exceeding said maximum permissible value indicates a first type of pressure sensor failure, while said cylinder pressure lower than said minimum permissible value indicates a second type of pressure sensor failure which can be discriminatively identified from said first type of pressure sensor failure.

4. A method of detecting a failure of a pressure sensor provided in association with a cylinder of an internal combustion engine for detecting the pressure therein, said method comprising the steps of:
   detecting the pressure in said cylinder by means of said pressure sensor at a first and a second predetermined crank angle, respectively, to provide a first and a second cylinder pressure;
   setting a maximum permissible value for said first cylinder pressure and a minimum permissible value for said second cylinder pressure;
   comparing said first cylinder pressure with said maximum permissible value;
   comparing said second cylinder pressure with said minimum permissible value; and
   determining that a failure takes place in said pressure sensor if said first cylinder pressure exceeds said maximum permissible value or if said second cylinder pressure becomes lower than said minimum permissible value.

5. A pressure sensor failure detecting method according to claim 4, wherein said first predetermined crank angle is set at bottom dead center of said cylinder at which said cylinder pressure becomes lowest on a suction stroke of said cylinder, while said second predetermined crank angle is set at top dead center of said cylinder at which said cylinder pressure becomes highest on a compression stroke of said cylinder.

6. A pressure sensor failure detecting method according to claim 4, wherein said maximum permissible value and said minimum permissible value are set for said first and second cylinder pressures in dependence on the magnitude of a load imposed on said engine.

7. A method of detecting a failure of a pressure sensor provided in association with a cylinder of an internal combustion engine for detecting the pressure therein, said method comprising the steps of:
   detecting the pressure in said cylinder by means of said pressure sensor at a first and a second predetermined crank angle, respectively, to provide a first and a second cylinder pressure;
   determining a difference between said first and second cylinder pressures;
   setting a threshold value as a reference for said difference;
   comparing said difference with said threshold; and
   determining that said pressure sensor suffers from a failure if said difference is less than said threshold value.

8. A pressure sensor failure detecting method according to claim 7, wherein said first predetermined crank angle is set at bottom dead center of said cylinder at which the pressure in said cylinder becomes lowest on a suction stroke of said cylinder, while said second predetermined crank angle is set at top dead center of said cylinder at which the pressure in said cylinder becomes highest on a compression stroke of said cylinder.

9. A pressure sensor failure detecting method according to claim 7, wherein said threshold value is changed in dependence on the magnitude of a load imposed on said engine.

10. A method of detecting a failure of a pressure sensor provided in association with a cylinder of an internal combustion engine for detecting the pressure therein, said method comprising the steps of:
    detecting the pressure in said cylinder by means of said pressure sensor on a power stroke of said cylinder to provide a cylinder pressure;
    detecting a peak crank angle corresponding to a peak value of said cylinder pressure;
    determining peak position information on the basis of said peak crank angle;
    setting a maximum permissible value and a minimum permissible value for said peak position information;
    comparing said peak position information with said maximum permissible value;

comparing said peak position information with said minimum permissible value; and determining that said pressure sensor suffers from a failure if said peak position information is above said maximum permissible value or if said peak position information is below said minimum permissible value.

11. A pressure sensor failure detecting method according to claim 10, wherein said peak position information represents a quantity for correcting ignition timing for said cylinder in a feedback manner.

12. A method of controlling the operation of an internal combustion engine in response to occurrence of a failure in a pressure sensor provided in association with a cylinder of said engine, said method comprising the steps of:

determining whether a failure has occurred in said pressure sensor on the basis of the pressure in said cylinder detected by said pressure sensor; and fixing an engine control parameter to suppress the pressure in said cylinder to a level below a predetermined level if it is decided that a failure has occurred in said pressure sensor.

13. An engine control method according to claim 12, wherein said suppression of said cylinder pressure is effected by a process selected from the group consisting of processes of leaning an air/fuel mixture supplied to said cylinder, lowering the pressure of intake air charged to said cylinder, lowering the pressure of intake air charged to said cylinder, limiting the degree of throttle opening below a predetermined level, and limiting the number of revolutions per minute of said engine to a value smaller than a predetermined value.

14. An engine control method according to claim 12, wherein said engine control parameter is fuel injection timing for said cylinder.

15. An engine control method according to claim 12, wherein said determination as to occurrence of a failure in said pressure sensor is made in accordance with one of the methods set forth in claims 1 to 11.

16. A method of controlling the operation of an internal combustion engine in response to occurrence of a failure in a pressure sensor provided in association with a cylinder of said engine, said method comprising the steps of:

determining whether a failure has occurred in said pressure sensor on the basis of the pressure in said cylinder detected by said pressure sensor;

fixing an engine control parameter if it is determined that a failure has occurred in said pressure sensor;

determining whether said failure is a mechanical failure; and stopping the control of said cylinder if said failure is determined to be the mechanical failure.

17. An engine control method according to claim 16, wherein said determination as to occurrence of a failure in said pressure sensor is made in accordance with one of the methods set forth in claims 1 to 11, while said determination as to whether said failure is a mechanical failure is made on the basis of at least one factor selected from the group consisting of abnormal lowering of engine output torque and abnormal temperature rise of said pressure sensor.

18. An apparatus for controlling operation of an internal combustion engine in response to occurrence of a failure in a pressure sensor provided in association with a cylinder of said engine, said apparatus comprising:

means for determining whether a failure has occurred in said pressure sensor on the basis of the pressure in said cylinder detected by said pressure sensor; and means for controlling an engine control parameter such that the pressure in said cylinder is suppressed to a level below a predetermined level if it is determined that said pressure sensor has suffered from a failure.

19. An engine control apparatus according to claim 18, wherein said determining means comprises a computer programmed to carry out one of the methods set forth in claims 1 to 11.

20. An engine control apparatus according to claim 19, wherein said engine control parameter is ignition timing for said cylinder which is controlled by said computer.

* * * * *